United States Patent Office 2,721,835
Patented Oct. 25, 1955

2,721,835

SURFACE TREATMENT OF ALUMINUM ARTICLES

Willard G. Axtell, Denver, Colo., assignor to Shwayder Bros., Inc., Denver, Colo., a corporation of Colorado No Drawing. Application July 7, 1951,
Serial No. 235,665

10 Claims. (Cl. 204—38)

This invention relates to the surface treatment of aluminum articles, and more particularly to a method of treating an aluminum article to produce an adherent paint or enamel coating thereon, and also to a solution for the electrolytic treatment of an aluminum article prior to the painting or enameling thereof.

Among the objects of this invention are to provide a novel method of surface treating an aluminum article; to provide such a method which includes the painting or enameling of the surface of such article; to provide a method of surface treating an aluminum article prior to paintaing or enameling thereof, which results in a more effective adherence of a paint or enamel like coating on the article; to provide such a method which may be carried out effectively and economically; to provide such a method which includes an electrolytic treatment which does not necessitate any aidtional drying or other treatment of the article prior to painting or enameling; to provide a novel solution for the electrolytic treatment of an aluminum article; to provide such a solution which is particularly useful in the electrolytic treatment of an aluminum article prior to the painting or enameling or the like thereof; to provide such a solution which may be readily controlled during use to produce the desired effects; to provide such a solution whose constituents may vary over a comparatively wide range; and to provide such a solution which may be used and maintained without particular difficulty. Additional objects and the novel features of this invention will become apparent from the description which follows.

In accordance with this invention, an aluminum article may be treated to produce a paint or enamel surface coating thereon, by first electrolytically treating the article for a short period of time in an electrolytic solution which is described with greater particularity hereinafter, but which consists essentially of phosphoric acid, chromic acid and water, and applying paint or enamel, i. e., a surface coating producing liquid, to the surface of the article without washing or complete drying. Preferably, the article is merely removed from the electrolytic solution after electrolytic treatment, though it may be permitted to drain as it is removed, and then dipped in the paint or enamel or the like. While not all paints and enamels are desirable, still a relatively large number may be used with success. The preferred enamel is an alkyd resin base enamel of the type ordinarily made from glycerol, phthalic anhydride, and linseed fatty acids. However, oil varnish base enamels may be used, while the preferred paint, although rubber or synthetic rubber base paints, or rubber or synthetic rubber base enamels, may be used is an oil base paint. Also, other enamels and paints, particularly those which are compatible with phosphoric acid under the conditions of use, may be used. In addition, other surface coating liquids adapted to produce an enamel like or paint like surface coating thereon may be utilized, such as those which remain in the condition of freshly applied enamel or paint and thus remain sticky or tacky. Also, enamels or the like which may be reheated or otherwise treated to produce a sticky or tacky coating by which another part may be bonded to the aluminum article, may be utilized.

Generally speaking, an aluminum article treated in accordance with this invention has a layer of aluminum oxide on the surface, and this layer normally interferes with the complete adhesion of paint or enamel to the surface. Thus, if a usual aluminum article having an oxide layer on the surface is enameled or painted, the enamel or paint coating tends to crack or chip off, particularly when the article is subjected to twisting, flexure, and the like. However, by first electrolytically treating the aluminum article in accordance with this invention, a surface coating of enamel or paint may be produced which does not have such tendency to crack or chip, and such articles have been subjected to bending, torsion, and the like, without disturbing the paint or enamel coating.

The solution of this invention for the electrolytic treatment of an aluminum article may have the following range of constituents:

| Constituent: | Proportion |
| --- | --- |
| Phosphoric acid | 1.51% to 8.4% by weight. |
| Chromic acid (as $CrO_3$) | 0.27% to 1.5% by weight. |
| Water | Balance. |

The preferred solution of this invention has the following composition:

| Constituent: | Proportion |
| --- | --- |
| Phosphoric acid | 1.68% by weight. |
| Chromic acid (as $CrO_3$) | 0.3% by weight. |
| Water | Balance. |

It will be noted that the chromic acid is indicated as $CrO_3$, or chromic anhydride, and it will be understood that whenever a percentage of chromic acid is given in this description and the appended claims, the chromic acid is to be measured either on the basis of chromic anhydride in the solutiin or of dry chromic anhydride added to the solution. Also, the above proportions of phosphoric acid are given on the basis of 100% anhydrous phosphoric acid, even though 85% phosphoric acid is more generally used. It will be understood that, when so used, the proportions will be corrected for the same. Thus, if 85% phosphoric acid is utilized, the range thereof may be from 1.78% to 9.9%, while the preferred solution will contain 1.98% of 85% phosphoric acid.

As evident from the above, the proportion of phosphoric acid to chromic acid as $CrO_3$, may be slightly greater than 5 to 1, although this ratio may be varied considerably, but in general the proportion of phosphoric acid is preferably greater than that of chromic acid. Thus, the proportion of chromic acid, as $CrO_3$, is preferably not more than about 1.5% and the proportion of phosphoric acid is not more than 8.4%.

The preferred solution of this invention has a pH of less than 2.3, and it is preferred to maintain the pH of the solution at or below this value. Thus, if during use the pH of the solution exceeds 2.3, then sufficient chromic acid (such as in the form of $CrO_3$) and phosphoric acid may be added to reduce the pH to less than 2.3. If desired, a greater amount of phosphoric than chromic acid may be added, to compensate for drag-out. The temperature of the solution may be maintained at from about 60° F. to about 120° F., conveniently at about room temperature.

The aluminum article to be treated is immersed in the solution, as the anode, for electrolytic treatment. The cathode may be the tank or a separate cathode immersed in the solution, while the voltage may be applied at from 2 to 30 volts. In treatment of aluminum articles in accordance with this invention, the amperage has been quite high at the instant of first passage of current, i. e. apparently approaching infinity, but drops rather quickly in a fraction of a second, and then drops to an extremely low value, approximately almost to zero, in a matter of a few additional seconds. The time during which the current is applied may be quite short, although the time is preferably at least 15 to 30 seconds. Thus, the time of electrolytic treatment may be from 5 seconds to 2 minutes, although 30 seconds has given excellent results on articles comprising aluminum strips formed in a general U-shape transversely, approximately 3/8" wide and 1/4" high, and from a few inches to several feet in length. Such strips are utilized as sealing strips for the edges of luggage cases, and are made of 24 ST aluminum. The method has also been successfully applied to 3S aluminum.

After a suitable time period, the article or articles may be removed from the solution, although each article may be permitted to drain as it is removed from the solution, if desired. However, it has been found to be unnecessary to wash or dry the article prior to the application of paint or enamel, so that the articles may be placed immediately (or at any subsequent time) in the paint or enamel to be applied to the surface, as dipping is a very convenient method of applying the paint or enamel. Of course, if only a portion of the article is to be painted or enameled and it is impossible to dip such portion with convenience, it may prove more desirable to spray or brush the paint or enamel on the desired surface portions of the article.

As indicated previously, an alkyd resin base enamel has been used with particular success, although oil varnish base enamel and oil base paints have also been used. The result of treatment in accordance with this invention has been to produce a paint or enamel coating on the surface of the article which is quite tenacious and adherent, and has not tended to crack or chip under conditions of comparatively severe usage, such as involving torsion, bending, and the like.

Since aluminum articles treated in accordance with this invention generally have a film or layer of aluminum oxide on the surface, it appears that this oxide layer, or at least a portion thereof, is removed during the electrolytic treatment, and a comparatively spongy layer, perhaps microscopic in thickness, formed on the surface. This spongy layer appears to be permeated by the solution, particularly the phosphoric acid, which remains thereon, or therein, when the article is removed from the solution. Since alkyd resin base enamels, oil varnish base enamels, and oil base paints are compatible with phosphoric acid, i. e. phosphoric acid is soluble therein, other paints, enamels, or liquids adapted to form a protective coating, which are compatible with phosphoric acid under the conditions of use, i. e. phosphoric acid is soluble therein, at least to a sufficient extent to permit the liquid to be applied to the surface and then dry or be baked thereon, can be used. By adding small amounts of phosphoric acid and chromic acid (such as in the form of $CrO_3$) to the solution, the life thereof can be maintained substantially indefinitely, although for long periods of use it may be found desirable to add additional phosphoric acid to compensate for drag-out, as indicated previously. From analytical work, it is suspected that the effective life of a given solution is limited by the change of valence of the chromic acid, i. e. a change from chromic ion to chromous ion. Also, there is apparently a precipitate formed in the solution, composed essentially of aluminum phosphate and aluminum chromate, or complex association involving one or both.

As will be evident, the noticeably short period of treatment time required, the absence of any requirement for washing or drying subsequent to electrolytic treatment, the ready control of the electrolytic solution, the ease with which the solution may be maintained in good working condition, the ease with which the solution may be initially made up, and the relatively wide range of proportion of the constituents and of the temperature involved—all contribute to the attainment of the objects hereinbefore set forth.

It will be understood that many variations may be made in the manner in which the current is applied, the solution is made up or replenished, the article is handled, the paint, enamel or the like is applied, and the form in which the constituents are added. Thus, the chromic acid may be added as chromic anhydride, or other chromic compound, while the phosphoric acid may be added in any concentration available, or as a compound of phosphoric acid. Also, a portion of the chromic acid and phosphoric acid may be added as chromic phosphate. Other ingredients may be added to the solution, as long as the essential active ingredients include chromic and phosphoric acids, or equivalents thereof. The article may be pure aluminum or an aluminum alloy, or other metal provided with an aluminum coating. It will also be understood that other variations may be made without departing from the spirit and scope of this invention.

What is claimed is:

1. A method of surface treating an aluminum article, which comprises immersing said article in an electrolytic solution consisting of about 0.3% chromic acid, as $CrO_3$, 1.68% phosphoric acid, and the balance water; maintaining said solution at a temperature between 60° F. and 120° F.; passing an electric current through said article as the anode at from 2 to 30 volts, for a period of between 5 seconds and 2 minutes; removing said article from said electrolyte; and, without washing or complete drying, dipping said article in a liquid selected from the group consisting of alkyd base enamels, oil varnish base enamels, and oil base paints.

2. A method of surface treating an aluminum article, which comprises electrolytically treating said article as the anode in an aqueous solution containing from about 1.5% to about 8.4% of phosphoric acid and from about 0.27% to about 1.5% of chromic acid, as $CrO_3$, said phosphoric acid being greater in proportion than said chromic acid.

3. A method of surface treating an aluminum article, which comprises immersing said article in an aqueous solution containing from 0.27% to 1.5% of chromic acid, as $CrO_3$, and from 1.51% to 8.4% of phosphoric acid; maintaining the pH of said solution at not more than about 2.3; passing an electric current through said article as the anode; removing said article from said solution; and, without washing or complete drying, dipping said article in a liquid selected from the group consisting of enamels and paints, said liquid being compatible with phosphoric acid in the conditions of use.

4. A method of surface treating an aluminum article, which comprises immersing said article in an electrolyte consisting of about 0.3% chromic acid, as $CrO_3$, about 1.68% phosphoric acid, and the balance water; maintaining said electrolyte at a temperature between 60° F. and 120° F.; passing an electric current through said article as the anode at from 2 to 30 volts, for a period of between 5 seconds and 2 minutes; removing said article from said electrolyte; and, without washing or complete drying, applying to said article a liquid selected from the group consisting of enamels and paints, said liquid being compatible with phosphoric acid in the conditions of use.

5. A method of surface treating a plurality of aluminum articles, which comprises immersing said articles in an aqueous solution containing from 0.27% to about 1.5% of chromic acid, as $CrO_3$, and from 1.51% to about 8.4% of phosphoric acid; maintaining said solution at a pH of not more than about 2.3 by adding phosphoric acid and chromic acid; and passing an electric current through each said article as an anode.

6. A method of surface treating a plurality of aluminum articles, which comprises immersing said articles in an aqueous solution containing from 0.27% to about 1.5% of chromic acid, as $CrO_3$, and from 1.51% to about 8.4% of phosphoric acid; maintaining said solution at a pH of not more than about 2.3 by adding phosphoric acid and chromic acid; passing an electric current through each said article as an anode, for a period of between 5 seconds and 2 minutes; removing each said article from said solution; and without washing or complete drying, dipping said article in a liquid selected from the group consisting of alkyd base enamels, oil varnish base enamels, and oil base paints.

7. A method of surface treating an aluminum article, which comprises immersing said article in an electrolytic solution consisting of about 0.3% chromic acid, as $CrO_3$, about 1.68% phosphoric acid, and the balance water; maintaining said solution at a temperature between 60° F. and 120° F.; maintaining the pH of said solution below about 2.3; passing an electric current through said article as the anode at from 2 to 30 volts, for a period of about 30 seconds; removing said article from said electrolyte; permitting said article to drain during removal; and, without washing or complete drying, dipping said article in an alkyd base enamel.

8. A method of surface treating an aluminum article, which comprises electrolytically treating said article as the anode in an aqueous solution containing from about 1.5% to about 8.4% of phosphoric acid and from about 0.27% to about 1.5% of chromic acid, as $CrO_3$, said phosphoric acid being greater in proportion than said chromic acid; removing said article; and, without washing or complete drying, applying to the surface of said article a surface coating producing liquid, selected from the group consisting of enamels, paints, enamel-like liquids and paint-like liquids, said liquid being compatible with phosphoric acid in the conditions of use.

9. A method of surface treating an aluminum article, which comprises immersing said article in an aqueous solution containing from about 0.27% to about 1.5% of chromic acid, as $CrO_3$, and from about 1.5% to about 8.4% of phosphoric acid, said phosphoric acid being greater in proportion than said chromic acid; maintaining the pH of said solution at not more than about 2.3; passing an electric current through said article as the anode; removing said article from said solution; and, without washing or complete drying, applying to the surface of said article a surface coating producing liquid, selected from the group consisting of enamels, paints, enamel-like liquids and paint-like liquids, said liquid being compatible with phosphoric acid in the conditions of use.

10. A method of surface treating an aluminum article, which comprises electrolytically treating said article for between 15 seconds and 2 minutes as the anode in an aqueous solution containing from about 1.5% to about 8.4% of phosphoric acid and from about 0.27% to about 1.5% of chromic acid, as $CrO_3$, said phosphoric acid being greater in proportion than said chromic acid; maintaining the pH of said solution at less than about 2.3; removing said article; and, without washing tor complete drying, applying to the surface of said article a surface coating producing liquid, selected from the group consisting of enamels, paints, enamel-like liquids and paint-like liquids, said liquid being compatible with phosphoric acid in the conditions of use.

References Cited in the file of this patent

UNITED STATES PATENTS

| | | |
|---|---|---|
| 1,730,349 | Auerbach | Oct. 8, 1929 |
| 2,036,962 | Fischer | Apr. 7, 1936 |
| 2,153,060 | Guthrie | Apr. 4, 1939 |
| 2,430,468 | Julich et al. | Nov. 11, 1947 |
| 2,647,865 | Freud | Aug. 4, 1953 |

OTHER REFERENCES

Mozley: "Metal Finishing," vol. 39 (1941), pp. 301–305.